H. A. ALDEN.
BELT LACING.
No. 29,348.                              Patented July 31, 1860.
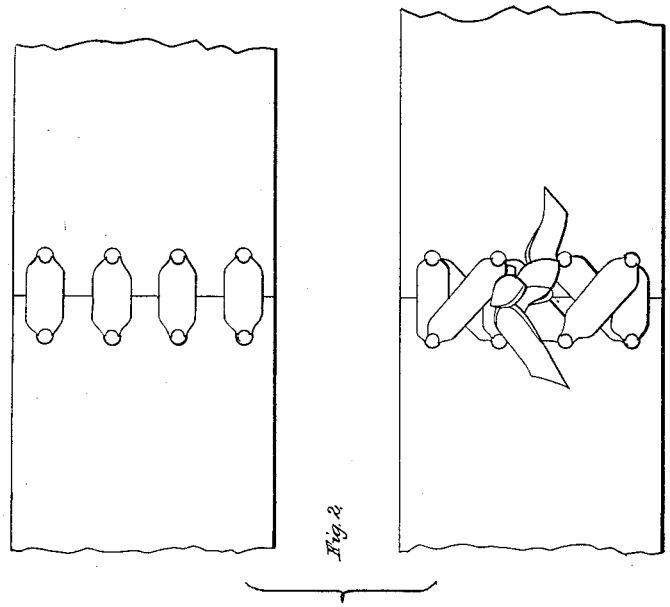
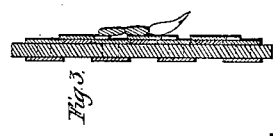
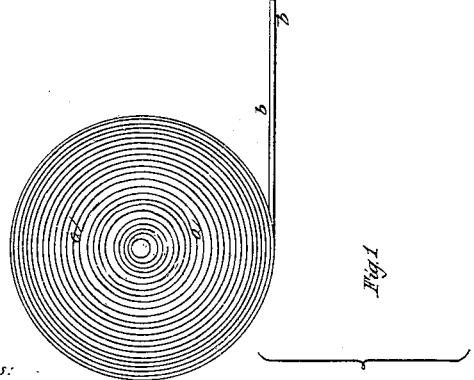

UNITED STATES PATENT OFFICE.

HENRY A. ALDEN, OF MATTEAWAN, NEW YORK, ASSIGNOR TO NEW YORK RUBBER COMPANY.

BELT-LACING.

Specification of Letters Patent No. 29,348, dated July 31, 1860.

*To all whom it may concern:*

Be it known that I, HENRY A. ALDEN, of Matteawan, in the county of Dutchess and State of New York, have invented a certain new and useful Lacing for Uniting Machinery and other Belts or Bands; and I do hereby declare that the following, taken in connection with the accompanying drawing, is a full and clear description thereof.

In the drawing, Figure 1 represents a coil of my improved lacing in the act of being unwrapped; Fig. 2, face views of two ends of a band as united by my new lacing; and Fig. 3 a transverse section through the lacing at the junction of the ends of the band.

The object of my invention is to produce a cheap and durable lacing of great strength that will admit of being drawn tight to pull the ends of the belt together, or hold them in overlapping relationship when that is preferred, and that will incorporate itself by the nature of its constituents with the material of which the belt in part or in whole is formed. To effect this object, I use any suitable fibrous material, such as cotton, hemp and so forth and weave it into sheets that may afterward be cut into strips or weave it direct into strips of the required width of the lacing and of any desired thickness. This woven strip (*a*) or the woven sheet out of which the strip is cut, I then coat either on one or both of its sides with india rubber or any other suitable cement (*b*) that, while scarcely or not at all sticky to handle, is firmly adhesive on being subjected to hard pressure. The lacing, if in a coil or longer piece than needed for a single lacing being then cut into lengths as required, and preferably left or cut with tapering ends, as seen in Fig. 2, to facilitate its passage through the holes in the band, is now ready for use and may be threaded through the ends of the band or through any two or more pieces or portions of belt to unite them as ordinary lacing is used.

By the employment of my new lacing however, not only is an article produced which is cheaper than leather lacing, but which has many other advantages. Thus, while being of great strength to resist tension so that it is comparatively free from stretch in direction of its length and may therefore be used to draw exceedingly close the ends or pieces of band to be united, it embodies the peculiarity of an adhesive surface not sticky or unpleasant to handle, but firmly adhesive under hard pressure and whereby it incorporates itself as it were with the fibrous or other material of which the ends or pieces of the belt or band are composed or with the cement or coating covering the same as for instance in the case of belts made up of fibrous material and india rubber or its compounds combined.

A lacing thus incorporating itself with the band must necessarily be freer from slip and the united ends or pieces of band are consequently held tighter.

I claim therefore as a new and useful article of manufacture—

Strips of woven material coated with an india rubber, gutta percha or other suitable cement, that while scarcely or not at all sticky to handle, is firmly adhesive on being subjected to pressure substantially as specified and applied as a belt or band lacing as described.

In testimony whereof I have signed my name to this specification before two subscribing witnesses.

HENRY A. ALDEN.

Witnesses:
 W. H. GERARD,
 J. N. WEED.